Aug. 6, 1935.  C. GABRIELSON  2,010,223
TYPEWRITING MACHINE
Filed March 20, 1934   2 Sheets-Sheet 1
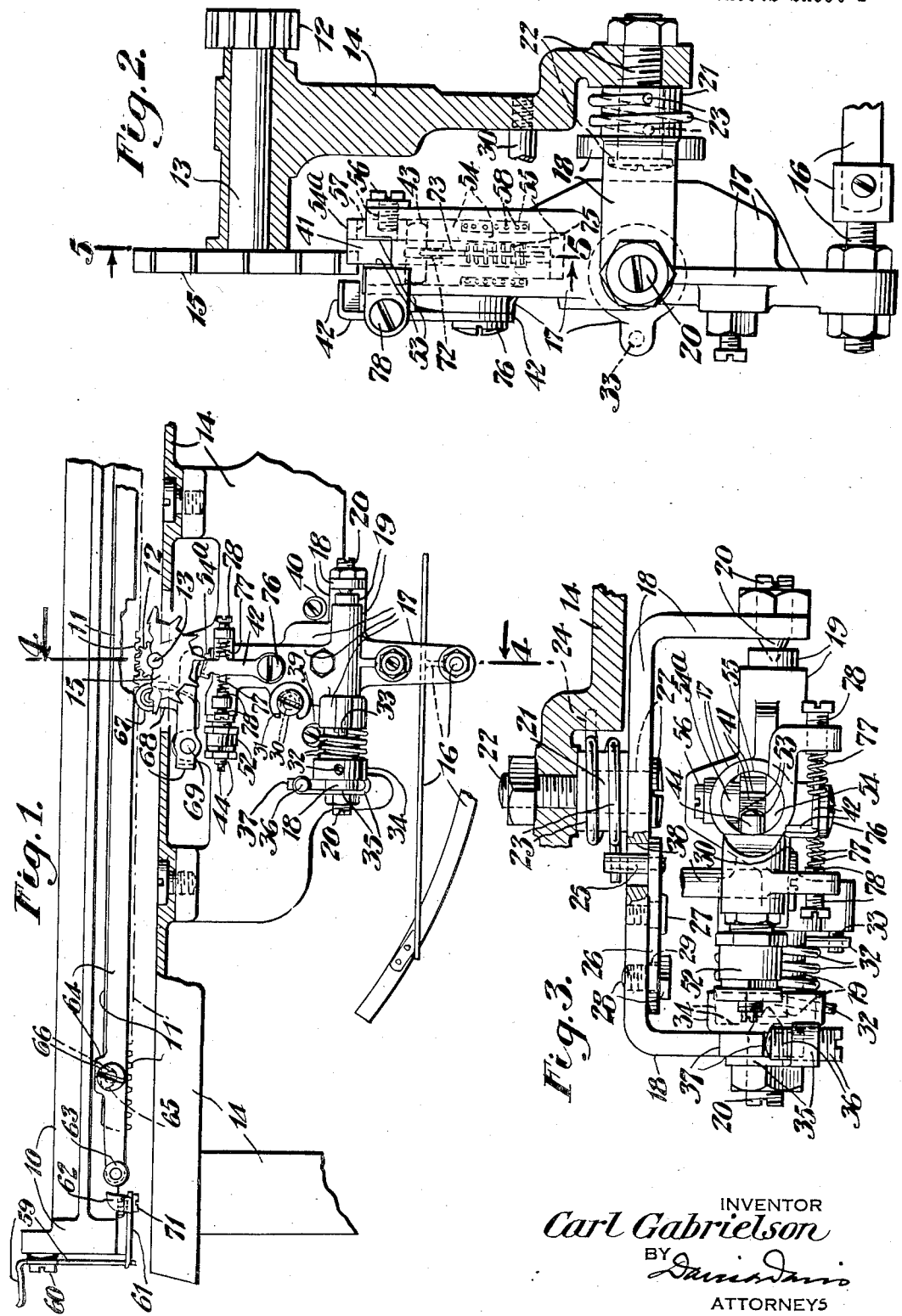
INVENTOR
Carl Gabrielson
BY
ATTORNEYS

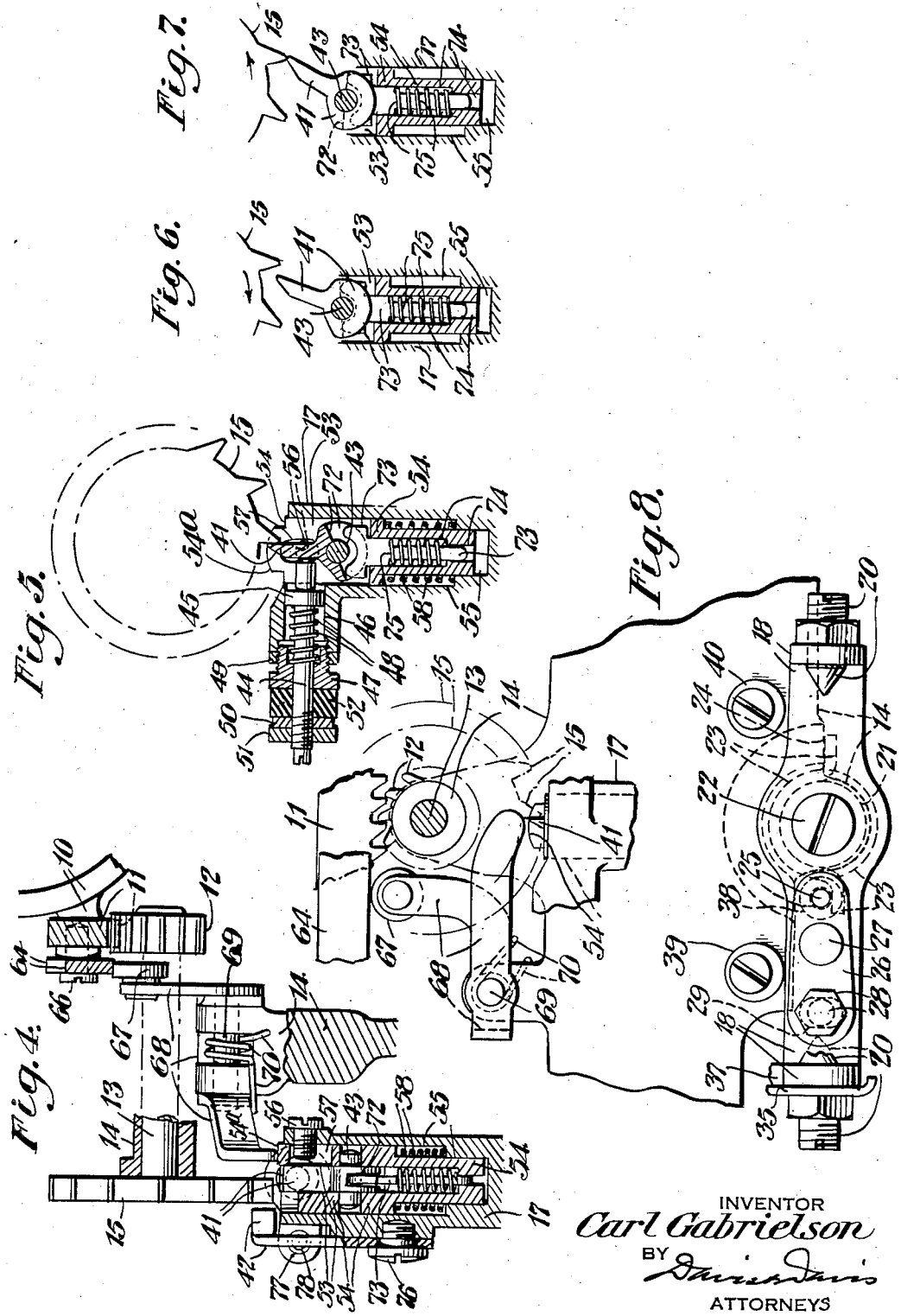

Patented Aug. 6, 1935

2,010,223

UNITED STATES PATENT OFFICE 2,010,223

TYPEWRITING MACHINE

Carl Gabrielson, Syracuse, N. Y., assignor to L. C. Smith & Corona Typewriters, Inc., Syracuse, N. Y., a corporation of New York Application March 20, 1934, Serial No. 716,497

18 Claims. (Cl. 197—88)

This invention relates to typewriting and like machines having a traveling carriage and escapement mechanism for the carriage.

Generally stated, the principal objects of the invention are to provide an improved carriage escapement mechanism which will operate to feed the carriage at least substantially without noise and will nevertheless afford accurate letter space feed movements of the carriage, and which will permit silent return movement of the carriage without the necessity of an escapement release operation.

More specifically stated, among the main objects of the invention are to provide an improved mounting for the escapement dog rocker and/or the holding and stepping dogs on the dog rocker whereby shocks and impacts incidental to the step-by-step letter space advance movements and the continuous or running return movements of the carriage are dissipated or absorbed before reaching the framework of the machine to prevent or substantially prevent the noise usually arising from carriage movements; and to provide an improved mounting of the dogs for convenient release of the carriage from control of the escapement when desired.

To these ends, and to other ends which will appear from the following description in detail of a preferred embodiment of the invention shown in the accompanying drawings, the invention consists in the combinations of devices, features of construction, and arrangements of parts pointed out in the appended claims and set forth in the following description.

In the accompanying drawings—

Fig. 1 is a fragmentary rear view of the machine showing the escapement mechanism and the escapement releasing means, part of the main frame of the machine being shown in vertical transverse section;

Fig. 2 is a view showing the escapement mechanism in side elevation, the parts being shown as they appear when looking to the left as the machine is shown in Fig. 1;

Fig. 3 is a top plan view showing the dog rocker and its mounting;

Fig. 4 is a detail vertical sectional view on the line 4—4 of Fig. 1, showing however the escapement release means actuated to release the carriage from control of the escapement;

Fig. 5 is a fragmentary sectional view on the line 5—5 of Fig. 2 showing the parts as normally positioned or positioned as at the conclusion of a letter space feed movement of the carriage;

Fig. 6 is a detail view showing the stepping dog and escapement wheel as the escapement wheel is held by the holding dog during a letter space feed of the carriage;

Fig. 7 is a detail view showing a tooth of the escapement wheel riding over the stepping dog during a return movement of the carriage; and Fig. 8 is a rear view of the escapement mechanism, with the escapement wheel and part of the dog rocker broken away or omitted to more clearly show other parts.

In the accompanying drawings the invention is shown embodied in a known typewriting machine, namely an L C Smith typewriting machine, only so much of which machine as is necessary to illustrate the invention in its embodiment therein being shown.

The platen carriage 10 moves transversely of the machine, being supported on the main framework 14 of the machine for such movement on suitable bearings (not shown), and being spring impelled in the known manner in the direction of its step-by-step letter feed movement, which direction of feed movement is from left to right as the machine is viewed from the rear as in Fig. 1. The straight rack 11 is held to the carriage and meshes with a pinion 12. This pinion is fixed on the forward end of a shaft 13 which is journalled in a suitable bearing on the stationary or main supporting framework 14 of the machine and has fixed on its rear end a circular rack or toothed escapement wheel 15. The universal bar device 16 of the machine is moved rearwardly on the down strokes of the keys and forwardly on the return or up strokes of the keys in the usual manner, and is also fastened in the usual manner to the lower end of the dog rocker 17 to rock the latter about an axis which extends transversely of the machine.

An improved shock absorbing and noise eliminating mounting for the dog rocker will now be described. The dog rocker is journalled in a rigid supporting yoke 18, the usual hub portions 19 of the rocker being journalled on the conical inner ends of the pivot screws 20, which screws extend transversely of the machine and are threaded through the transversely spaced and rearwardly extending side arms of the yoke and locked by suitable lock nuts. The transversely extending portion of the yoke which connects the side arms of the yoke is provided about midway its ends with a forwardly extending hub 21 which is journalled on the rear portion of a pivot bolt 22 which extends horizontally fore-and-aft of the machine and has its forward portion non-rotatively held to the stationary framework 14 of the machine with the aid of a suitable clamping nut. A stiff spring 23 is wound helically about the hub of the yoke and has one end thereof engaged under a part of the framework 14 at 24 at one side of the hub and has its other end engaged under a pin 25 carried by the yoke at the opposite side of the hub. In order that the tension of spring 23 may be varied, pin 25 extends through a hole 38 in the yoke and is fixed to one end of a lever 26, which lever is pivoted on the yoke at 27 and is locked to the yoke in pivotally adjusted position by means of a clamping bolt 28 which is threaded in the yoke and extends through a slot 29 in the lever near the other end of the lever.

A return movement stop is provided for the dog rocker, this stop comprising a fore-and-aft extending bolt 30 which is threaded at its forward end into the stationary framework 14 and has its head normally engaged behind the dog rocker above the pivotal axis of the dog rocker. The shank of bolt 30 passes through a slot 31 in the dog rocker, the walls of this slot being spaced from the shank of the bolt (as shown in dotted lines in Fig. 1) to permit the dog rocker to rock slightly bodily with the yoke 18 about the yoke pivot 22 as an axis. The dog rocker is normally held rocked into contact with the head of the stop bolt 30 by the dog rocker return spring 32 which is helically wound about one of the hubs 19 of the dog rocker. One end of spring 32 is engaged over a pin 33 fixed to the dog rocker, and the other end of the spring projects through a hole in a cup like member 34, into which member extends one of the dog rocker hubs. For varying the tension of spring 32, member 34 is rotatively adjustable about the said dog rocker hub, said member having, for adjusting it, an arm 35 which is pivoted on the adjacent dog rocker pivot screw 20 and has threaded therethrough an adjusting screw 36, the forward end of which screw abuts the rear face of an upstanding projection 37 on the adjacent side arm of yoke 18.

The yoke spring 23 rocks the yoke 18 clockwise as viewed in Figs. 1 and 8 and normally holds the yoke engaged under a stop 39 and spaced slightly downward from a stop 40 for the yoke. Stops 39 and 40 are held to the framework 14 by screws, as shown in Fig. 8.

The dog rockers of escapements of the various known constructions, including the construction embodied in the known L C Smith typewriting machine, may be provided with the improved dog rocker mounting of the present invention above described with effective results in the reduction or elimination of noise, but more effective elimination of noise and an improved releasing of the escapement is attained by conjoint use of the improvements above described and the further improvements or features of the invention which will now be described. The said further improvements also may be used without those above described with very effective results in the reduction or elimination of noise.

The dog rocker carries a stepping dog 41 and a holding dog 42 alternately engageable with the teeth of the escapement wheel 15, the holding dog being normally disengaged from the wheel and the stepping dog being normally engaged with a tooth of said wheel, as shown in Figs. 1 and 2, to hold the carriage at the end of a letter space feed movement of the carriage, the respective normal positions of the dogs 41 and 42 being shown in Figs. 1, 2, 3, 5 and 8.

Stepping dog 41 is pivoted near its lower end on a pivot 43 to swing transversely of the machine, the upper end of the dog being normally engaged with a tooth of wheel 15 to hold the wheel against turning under the urging of the usual carriage impelling spring. The dog 41 is held against the tooth pressure by the engagement therewith between its tooth engaging end and its pivot 43 of one end of a stop plunger 44 extending transversely of the machine.

This plunger forms part of a shock absorbing stop device for the stepping dog which device is adjustable to vary the normal position of dog 41 and to vary the yielding resistance to movement of the dog engaging plunger by the dog 41. The plunger 44 has a collar 45 sliding in a bore 46 in the dog rocker and said plunger slides through a plunger spring tension adjusting nut 47 threaded in bore 46 and compressing the plunger spring 48 between said nut 47 and the collar 45. A suitable lock nut 49 may be threaded on nut 47 against the dog rocker, as shown most clearly in Fig. 5. For adjusting the plunger transversely of the machine an adjusting nut 50 and a lock nut 51 are threaded on the plunger, the nut 50 normally engaging a rubber bumper 52 which abuts nut 47. This rubber bumper 52 and the plunger spring 48 absorb shocks and noise vibrations due to arrest of pivotal movement of the stepping dog 41 by the plunger, the arrangement of the dog and plunger being such as to largely preclude transmission of shock to the dog pivot.

The normal relation of the dogs to the escapement wheel now being apparent, the improved provisions for releasing the carriage from control of the escapement will now be described. The dog 41 swings in a slot 53 in the upper portion of a vertically reciprocable plunger 54, the pivot 43 of the dog being confined in a suitable bearing bore in the slotted upper portion of the plunger, as shown most clearly in Fig. 4. Plunger 54 slides vertically in a bore 55 in the upper end of the dog rocker, a screw 56 threaded in the dog rocker projecting into a vertical slot 57 in the plunger to limit reciprocatory motion of the plunger and to prevent rotation of the plunger in bore 55. Plunger 55 is normally held pressed up to the limit of its upward movement, as shown most clearly in Figs. 2 and 5, by a spring 58 confined between suitable shoulders on the plunger and dog rocker, said spring being omitted in Figs. 6 and 7. At the forward side of dog 41 and slot 53 the plunger 54 has a projection 54ª normally extending out of bore 55 above the upper end of the dog rocker.

Dog 41 is disengaged from wheel 15 to free the carriage from control of the escapement, by pressing down on part 54ª of plunger 54 until the plunger is depressed sufficiently to free the dog from the wheel, as shown in Fig. 4.

Preferably this is done by means of a manually operable escapement release means similar to that employed in the known L C Smith typewriting machine hereinbefore referred to. Said manually operable means comprises a hand lever 59 which is pivoted on the carriage 10 at 60 to swing fore-and-aft of the machine, said lever having a pendant arm engaged with one arm of a horizontally swingable bellcrank lever 61 to rock lever 61, said lever 61 being held to the carriage by a vertical pivot 71. The other arm of bellcrank lever 61 has an upstanding projection 62 for pressing against a roller 63 journalled on a bar 64 to press said bar toward the right as viewed in Fig. 1. Near each end thereof bar 64 has a cam slot 65 through which extends the shank of a screw 66 threaded in the carriage rack 11, only one slot and one screw being shown. Bar 64 travels with the carriage over a roller 67 journalled on a yoke 68 pivoted on the framework 14 at 69, a spring 70 normally holding the yoke rocked into the position shown in Figs. 1 and 8 to hold the bar 64 up in the position shown in said Figs. 1 and 8. When the bar 64 is pressed toward the right as viewed in Fig. 1, the cam slots 65 coact with screws 66 to depress the bar and thereby rock the yoke 68 to cause the latter to depress the plunger far enough to disengage dog 41 from the escapement wheel, as shown in Fig. 4.

The description of the improved mounting and action of the escapement dogs 41 and 42 will now be continued. The lower pivoted end of the stepping dog is provided with a downwardly facing open slot 72 extending transversely of the machine across the lower end of the dog. A vertically reciprocable positioning plunger 73 for the stepping dog 41 is guided in a bore 74 in the lower part of the supporting plunger 54 for said dog. A helical spring 75 compressed in said bore between shoulders on the two plungers normally forces plunger 73 upward, said plunger having a forked upper end extending into slot 72 in dog 41 and straddling the pivot 43 of the dog. In the stepped position (shown in Fig. 6) of dog 41 the ends of the two branches of the forked head of plunger 73 engage the top wall of slot 72 in the dog at both the left and right hand sides of the dog pivot 43 to yieldingly hold the dog in its stepped position.

The holding dog 42 has a forwardly projecting nose at its upper end for engagement by the teeth of the escapement wheel. This dog is pivotally held at its lower end to the rear face of the upper portion of the dog rocker 17 by a pivot screw 76 for swinging of the dog transversely of the machine and relatively to the dog rocker. Dog 42 is held balanced in a substantially upright position by two strong and directly opposed compression springs 77 of the helical type, the axes of which springs extend transversely of the machine. The inner ends of the two springs press against the right and left hand edges of the dog between the nose and the pivot of the dog, and preferably press said dog edges close to the nose and farther from the pivot as shown. Lugs on the dog extend into the inner ends of the helical springs as shown most clearly in Fig. 1. The tension of springs 77 is adjustable by means of adjusting screws 78 threaded through rearwardly projecting parts of the dog rocker and abutting the outer ends of the springs, said screws having reduced end portions extending into the outer ends of the springs as most clearly shown in Figs. 1 and 3. The described mounting and spring balancing of the dog 42 is such as to very effectually absorb shocks or impacts imparted to the dog and to substantially entirely prevent transmission to the dog rocker of vibrations due to such shocks and impacts. Not only is the holding dog 42 a yieldingly balanced pivoted dog, but the arrangement above described is such that the dog pivot is almost entirely relieved of shock imparted to the dog by a tooth of the escapement wheel.

The mode of operation of the improved escapement is as follows:

Upon rearward movement of the universal bar the dog rocker swings on pivots 20 carrying the stepping dog 41 forwardly in the machine out of contact with the tooth by which it has been holding the escapement wheel and carrying the holding dog forwardly in the machine until its nose is positioned in the path of movement of said tooth of the now released wheel, which tooth moves against the nose of the holding dog which then stops the rotation of the wheel after the carriage has moved a part of one letter space under the influence of the carriage movement impelling spring. In the meantime the released stepping dog is rocked by its positioning plunger 73 to its stepped position (Fig. 6), in which position it is quietly arrested by said plunger. On the forward or return movement of the universal bar the dog rocker is returned to its normal position, carrying the holding dog rearward to release the escapement wheel and carrying the stepped stepping dog rearward into the path of the next advancing tooth of the now released wheel from that tooth from which the dog was last previously disengaged, said next tooth of the released and rotating wheel engaging the stepping dog and rocking the latter back against plunger 44 into the position shown in Fig. 5, whereupon the carriage is arrested with one full letter space movement completed.

The holding dog balancing springs 77 are of sufficient strength to prevent more than an extremely minute oscillation of the dog 42 about its pivot under tooth impact, a movement of the nose end of the dog of only a fraction of a thousandth of an inch under tooth impacts occurring in normal operation of the machine. These springs practically instantaneously bring the dog 42 to a condition of rest in its normal pivotally adjusted relation to the dog rocker after a wheel tooth impacts the dog, the duration of the oscillation of the dog being only a very small fraction of the period of time usually required for feeding the carriage a single letter space, so that the desired uniformity of letter spacing of typed characters is attained notwithstanding the cushioned mounting of this dog. A similarly minute reciprocatory movement of plunger 44 and oscillatory movement of stepping dog 41 occurs at the end movement of the letter space movement, which movements also last for a very small fraction of the time required to feed the carriage one letter space, the plunger and dog being practically instantaneously brought to rest by the action of spring 48, cushion 52, and the force of the carriage impelling spring which is transmitted ultimately to the dog 41 by the escapement wheel tooth engaged with said dog.

The dog rocker and its supporting yoke 18 are adapted to swing as a unit about pivot 22 under tooth impacts on the dogs in letter feeding the carriage to prevent transmission to the framework 14 of shocks received by the dog rocker during such feeding of the carriage. Such oscillation of the dog rocker and the yoke on pivot 22 is very minute and practically instantaneously ceases with the yoke returned into engagement with stop 39, due to the resistance of the spring 23, the upper or dog carrying end of the rocker swinging transversely of the machine in ordinary feed operations only a fraction of a thousandth of an inch. The swinging movement about pivot 22 is so slight and of such minute duration as not to cause noticeable non-uniformity of letter spacing. This movement results in absorption of the shocks and substantially prevents transmission of noise producing vibrations from the dog rocker to the framework 14. Stop 40 prevents excessive tilting of the yoke 15 under pressure of a tooth of wheel 15 on either dog. Yoke 18 swings in a fixed plane about a fixed axis, and rocker 17 swings in the yoke about an axis fixed relatively to the yoke and extending transversely of the pivotal axis of the yoke.

During return movement of the carriage the teeth of wheel 15 rock the dog 41 as shown in Fig. 7, the dog being restored quietly by plunger 73 to its stepped position shown in Fig. 6 after each tooth passes by the dog.

What I claim is:

1. A typewriting or like machine having a carriage traveling on a frame and an escapement for the carriage, characterized in that said escapement comprises a toothed element and a dog rocker carrying dogs which are coactive with the toothed element to feed the carriage step-by-step and are yieldable relatively to the rocker under impacts of the teeth of said toothed element for silent feeding of the carriage.

2. A typewriting or like machine having a carriage feeding escapement comprising a toothed element and a dog rocker having dogs coactive with said element to feed the carriage step-by-step, characterized in that said dog rocker is supported from the frame to yield relatively to said frame under impacts of teeth of said toothed element for silent feeding of the carriage.

3. A typewriting or like machine as claimed in claim 2, characterized in that the dog rocker is supported to rock for feeding the carriage in a support which is pivotally held to the frame to rock under impacts of the teeth of the toothed element, the rocking of which support under the tooth impacts is yieldingly resisted as by a spring, for example.

4. A typewriting or like machine having a carriage which travels on a frame of the machine and is fed step-by-step by an escapement comprising a toothed element and a dog rocker carrying a stepping dog and a holding dog alternatively engageable with the teeth of the toothed element, characterized in that both dogs are pivoted to swing under tooth impact and are yieldingly cushioned, and the stepping dog is pivoted on a yieldingly mounted support which is shiftable against the yielding resistance to release the carriage from control of the escapement.

5. In a typewriting or like machine having a frame and a carriage traveling on the frame, a carriage escapement for feeding the carriage step-by-step in one direction, comprising a toothed element which moves when the carriage moves in said direction, a dog rocker having dogs coactive with the teeth of said element to feed the carriage when the rocker is rocked, a support on which the dog rocker is pivoted to rock for feeding the carriage, means connecting the dog rocker support to the machine frame to swing about a fixed axis under tooth impacts received by the dogs, and means for yieldingly resisting swinging of the dog rocker support under such impacts on the dogs.

6. In a typewriting or like machine having a frame and a carriage traveling on the frame, a carriage escapement for feeding the carriage step-by-step in one direction comprising a toothed element which moves when the carriage moves in said direction, a dog rocker having dogs coactive with the teeth of said element to feed the carriage when the rocker is rocked, a support on which the dog rocker is pivoted to rock for feeding the carriage, means connecting the dog rocker support to the machine frame to swing about a fixed axis under tooth impacts received by the dogs, means normally urging said dog rocker support about said fixed axis in a direction opposite to that in which the support swings under tooth impact on the dogs, and a stop on the frame for limiting pivotal movement of the support by said last-mentioned means.

7. In a typewriting or like machine having a frame and a carriage traveling on the frame, a carriage escapement for feeding the carriage step-by-step in one direction comprising a toothed element which moves when the carriage moves in said direction, a dog rocker having dogs coactive with the teeth of said element to feed the carriage when the rocker is rocked, a support on which the dog rocker is pivoted to rock for feeding the carriage, means connecting the dog rocker support to the machine frame to swing about a fixed axis under tooth impacts received by the dogs, means normally urging said dog rocker support about said fixed axis in a direction opposite to that in which the support swings under tooth impact on the dogs, and means for limiting swinging movement of the support in both directions about its pivotal axis.

8. In a typewriting or like machine having a frame and a carriage traveling on the frame, a carriage escapement for feeding the carriage step-by-step in one direction, comprising a toothed element which moves when the carriage moves in said direction, a dog rocker having dogs coactive with the teeth of said element to feed the carriage when the rocker is rocked, a support on which the dog rocker is pivoted to rock for feeding the carriage, means connecting the dog rocker support to the machine frame to swing about a fixed axis under tooth impacts received by the dogs, a spring engaged with the support and frame to yieldingly resist swinging of the dog rocker support under tooth impacts on the dogs, and means on the frame for limiting swinging of the dog rocker support in both directions.

9. In a typewriting or like machine having a main frame, and a platen carriage which travels transversely of the machine on said frame, the combination with said carriage and frame of an escapement for letter feeding the carriage comprising a toothed element which moves when the carriage moves in letter feed direction, a dog rocker support pivotally held to the main frame to swing about an axis extending fore-and-aft of the machine, a dog rocker pivoted on said support to swing fore and aft of the machine, a pair of feed dogs on said rocker alternatively engageable with the toothed element to feed the carriage when the rocker is rocked fore-and-aft of the machine, and means yieldingly resisting swinging of the dog rocker support about said fore-and-aft extending axis when either dog is engaged by a tooth of said toothed element.

10. In a typewriting or like machine, having a frame upon which a platen carriage travels, a carriage escapement comprising a dog rocker support, a dog rocker pivoted on the support for rocking about an axis fixed relatively to the support to feed the carriage, means mounting the support on the frame to tilt in a fixed plane under feed shocks received by the rocker, and means yieldingly resisting such tilting of the support.

11. In a typewriting or like machine having a frame upon which a platen carriage travels, a carriage escapement comprising a dog rocker, and means supporting the dog rocker on the frame for rocking about an axis to feed the carriage and for swinging of said axis against yielding resistance and in a fixed plane about a fixed axis which extends transversely of the first axis.

12. In a typewriting or like machine having a frame and a platen carriage which travels back and forth on said frame, the combination of a toothed element which moves when the carriage moves in one direction, a dog rocker carrying feed dogs coactive with the teeth of said element to feed the carriage step-by-step in said one direction, a dog rocker support on which said rocker is pivoted to rock about a pivotal axis to alternatively engage said dogs with the toothed element, means mounting said rocker support on the frame to swing, under tooth impacts on the dogs, about an axis which extends substantially at right angles to the said pivotal axis of the rocker, means urging the rocker support about its axis in a direction opposite to that in which said support swings under the tooth impacts on the dogs, and means for arresting swinging movement of the dog rocker support by said support urging means.

13. In a typewriting or like machine having a main frame and a platen carriage which travels transversely of the machine on said frame, the combination of a toothed element which moves when the carriage moves in one direction, a dog rocker carrying feed dogs coactive with the teeth of said element to feed the carriage step-by-step in one direction, a dog rocker support on which said rocker is pivoted to rock about a pivotal axis to alternatively engage said dogs with the toothed element, means mounting said rocker support on the main frame to swing, under tooth impacts on the dogs, about an axis which extends substantially at right angles to the said pivotal axis of the rocker, and means yieldingly resisting swinging of the rocker support under the tooth impacts on the dogs and normally holding said support rocked into a predetermined position in which the pivotal axis of the rocker extends transversely of the machine.

14. In a typewriting or like machine having a carriage which travels transversely of the machine on the main frame of the machine, the combination of a toothed element which moves when the carriage moves in one direction, an escapement dog rocker, stepping and holding dogs on the rocker, a support on which the rocker is pivoted to rock for engaging the stepping and holding dogs alternately with the teeth of the toothed element to feed the carriage in said one direction, means holding the rocker support to the main frame to tilt against spring resistance under tooth impacts on the dogs, cushioned arresting means for limiting movement of the stepping dog by the teeth of the toothed element at the end of a feed movement of the carriage in said one direction, and means whereby the holding dog may yield under tooth impacts.

15. In a typewriting or like machine having a carriage which travels transversely of the machine on the main frame of the machine, the combination of a toothed element which moves when the carriage moves in one direction, an escapement dog rocker, stepping and holding dogs on the rocker, a support on which the rocker is pivoted to rock for engaging the stepping and holding dogs alternately with the teeth of the toothed element to feed the carriage in said one direction, means holding the rocker support to the main frame to tilt against spring resistance under tooth impacts on the dogs, a shiftable support on the rocker to which the stepping dog is pivotally held, escapement release means for shifting said dog support to release the carriage from control of the escapement, spring urged means on said support constantly tending to swing the stepping dog into its stepped position and hold it there, said stepping dog being swingable in opposite directions from its stepped position by the teeth of said toothed element, means pivotally holding the holding dog to the dog rocker to swing under tooth impacts, means yieldingly resisting swinging of the holding dog on its pivot, and yieldable means for arresting swinging of the stepping dog by the teeth of said toothed element to stop movement of the carriage at the end of a letter feed movement of the carriage.

16. A typewriting or like machine having a carriage escapement comprising a toothed element which moves when the carriage moves in letter feed direction, a dog rocker, a pivoted stepping dog on the dog rocker normally engaged with a tooth of said element, a stepping dog stop shiftable on the dog rocker transversely of the pivotal axis of the stepping dog and against which said dog is normally held pressed by the engaged tooth at a point between the tooth engaged end of the dog and the pivotal axis of the dog, stepping means on the rocker for the stepping dog, a holding dog having a tooth engaging end and pivoted at its opposite end on the rocker, yielding means resisting shifting of the stepping dog stop by the stepping dog, and opposed yielding means pressing in opposite directions on the holding dog between the pivoted and tooth engaging ends of the holding dog, said two opposed means opposing swinging movement of the dog in different directions about its pivot and normally holding said dog balanced between said two means.

17. A typewriting or like machine as claimed in claim 16, wherein the dog rocker is pivoted to rock on a support which is mounted in the machine to tilt under tooth impacts on the dogs, tilting of which support is resisted by yieldable means which normally holds the support in a predetermined position.

18. Escapement mechanism, for a typewriting or like machine having a carriage and a frame on which the carriage travels transversely of the machine, comprising a toothed element which moves when the carriage moves in letter feed direction, a dog rocker, escapement dogs on the rocker coactive with the toothed element for letter feeding the carriage, a support on which the rocker is pivoted to rock for letter feeding the carriage, a universal bar for rocking the rocker in one direction about its pivotal axis on said support, a return spring connected with the support and rocker for rocking the rocker in the opposite direction about said pivotal axis, a stop on the frame for limiting rocking of the rocker by said return spring, means holding said support to the frame to tilt relatively to the frame and said stop under tooth impacts on the escapement dogs, and resilient means resisting such tilting of said support.

CARL GABRIELSON.